United States Patent
Feng et al.

(10) Patent No.: US 12,039,766 B2
(45) Date of Patent: Jul. 16, 2024

(54) IMAGE PROCESSING METHOD, APPARATUS, AND COMPUTER PRODUCT FOR IMAGE SEGMENTATION USING UNSEEN CLASS OBTAINING MODEL

(71) Applicants: BOE TECHNOLOGY GROUP CO., LTD., Beijing (CN); PEKING UNIVERSITY, Beijing (CN)

(72) Inventors: Jie Feng, Beijing (CN); Yadong Mu, Beijing (CN); Shuai Wang, Beijing (CN); Guiyu Tian, Beijing (CN); Yiming Bai, Beijing (CN); Xiangye Wei, Beijing (CN); Ge Ou, Beijing (CN); Qiong Wu, Beijing (CN)

(73) Assignees: BOE TECHNOLOGY GROUP CO., LTD., Beijing (CN); PEKING UNIVERSITY, Beijing (CN)

( * ) Notice: Subject to any disclaimer, the term of this patent is extended or adjusted under 35 U.S.C. 154(b) by 351 days.

(21) Appl. No.: 17/754,158

(22) PCT Filed: Apr. 15, 2021

(86) PCT No.: PCT/CN2021/087579
§ 371 (c)(1),
(2) Date: Mar. 25, 2022

(87) PCT Pub. No.: WO2021/233031
PCT Pub. Date: Nov. 25, 2021

(65) Prior Publication Data
US 2022/0292805 A1    Sep. 15, 2022

(30) Foreign Application Priority Data
May 21, 2020 (CN) .......................... 202010438187.9

(51) Int. Cl.
*G06V 10/26* (2022.01)
*G06V 10/44* (2022.01)
(Continued)

(52) U.S. Cl.
CPC .............. *G06V 10/26* (2022.01); *G06V 10/44* (2022.01); *G06V 10/764* (2022.01);
(Continued)

(58) Field of Classification Search
CPC ........ G06V 10/26; G06V 10/44; G06V 10/82; G06V 10/84; G06V 10/764; G06V 10/774;
(Continued)

(56) References Cited

U.S. PATENT DOCUMENTS 11,507,800 B2 * 11/2022 Lin ...................... G06F 16/5854
11,663,293 B2 * 5/2023 Gao ........................ G06N 3/045
382/100

(Continued)

FOREIGN PATENT DOCUMENTS

CN    105005794 A    10/2015
CN    108229478 A    6/2018
(Continued)

OTHER PUBLICATIONS

Mihai et al, "Automated system for annotating and retrieving images", IEEE International Conference on Signal and Image Processing Applications (ICSIPA) (pp. 490-494). (Year: 2011).*
(Continued)

*Primary Examiner* — Scott A Rogers
(74) *Attorney, Agent, or Firm* — Frank Gao, Esq.

(57) ABSTRACT

The present disclosure provides an image processing method, apparatus, device, and computer-readable storage medium. The method includes: obtaining an image dataset, the image dataset including an image and an accompanying
(Continued)

text related to an unseen class in the image; and generating a probability and/or distribution of the unseen class using an unseen class obtaining model, the probability and/or distribution of the unseen class including a probability that each pixel in the image is from the unseen class, a probability that the unseen class is present in the image, and a regional probability after the image is subdivided into a plurality of regions.

20 Claims, 7 Drawing Sheets

(51) Int. Cl.
*G06V 10/764* (2022.01)
*G06V 10/774* (2022.01)
*G06V 10/82* (2022.01)
*G06V 10/84* (2022.01)
*G06V 20/40* (2022.01)
*G06V 30/19* (2022.01)
*G06V 30/262* (2022.01)

(52) U.S. Cl.
CPC ............ *G06V 10/774* (2022.01); *G06V 10/82* (2022.01); *G06V 10/84* (2022.01); *G06V 20/41* (2022.01); *G06V 30/19147* (2022.01); *G06V 30/274* (2022.01)

(58) Field of Classification Search
CPC . G06V 20/41; G06V 30/19147; G06V 30/274
See application file for complete search history.

(56) References Cited

U.S. PATENT DOCUMENTS

| | | | |
|---|---|---|---|
| 2019/0087964 A1 | 3/2019 | Chen et al. | |
| 2022/0292805 A1* | 9/2022 | Feng | G06N 7/01 |
| 2023/0010947 A1* | 1/2023 | Wang | G06T 5/77 |

FOREIGN PATENT DOCUMENTS

| | | | | |
|---|---|---|---|---|
| CN | 108229519 A | | 6/2018 | |
| CN | 111311613 A | * | 6/2020 | ........... G06N 3/0454 |
| CN | 111612010 A | | 9/2020 | |
| CN | 110837836 B | * | 9/2022 | ............ G06K 9/342 |
| CN | 115797632 A | * | 3/2023 | |
| CN | 117078714 A | * | 11/2023 | |

OTHER PUBLICATIONS

Lampert et al, "Attribute-based classification for zero-shot visual object categorization." IEEE transactions on pattern analysis and machine intelligence 36.3 (pp. 453-465). (Year: 2013).*

Carneiro, Gustavo, and Nuno Vasconcelos. "Formulating semantic image annotation as a supervised learning problem." 2005 IEEE Computer Society Conference on Computer Vision and Pattern Recognition (CVPR'05). vol. 2. IEEE. (Year: 2005).*

Socher, Richard, et al. "Zero-shot learning through cross-modal transfer." Advances in neural information processing systems 26. (Year: 2013).*

Carneiro, Gustavo, et al. "Supervised learning of semantic classes for image annotation and retrieval." IEEE transactions on pattern analysis and machine intelligence 29.3 (pp. 394-410). (Year: 2007).*

Du, Yuming, Yang Xiao, and Vincent Lepetit. "Learning to better segment objects from unseen classes with unlabeled videos." Proceedings of the IEEE/CVF international conference on computer vision. (Year: 2021).*

Luddecke, Timo, and Alexander Ecker. "Image segmentation using text and image prompts." Proceedings of the IEEE/CVF conference on computer vision and pattern recognition. (Year: 2022).*

Chen, Tao, et al. "Semantically meaningful class prototype learning for one-shot image segmentation." IEEE Transactions on Multimedia 24 (pp. 968-980). (Year: 2021).*

\* cited by examiner

IMAGE PROCESSING METHOD, APPARATUS, AND COMPUTER PRODUCT FOR IMAGE SEGMENTATION USING UNSEEN CLASS OBTAINING MODEL

CROSS-REFERENCE TO RELATED APPLICATIONS

This patent application claims the priority of Chinese Patent Application No. 202010438187.9 filed on May 21, 2020, and the contents disclosed in the above Chinese patent application are hereby cited in its entirety as a part of the present application.

TECHNICAL FIELD

The present application relates to an image processing method, apparatus, device, computer-readable storage medium, and image segmentation method.

BACKGROUND

Image segmentation is one of the core technologies in a field of computer vision. This technology aims to perform pixel-level semantic annotation on images. An input of an image segmentation model is generally an ordinary image or video frame, and an output is a semantic label of each pixel (a class of the label is usually specified in advance).

SUMMARY OF THE INVENTION

According to one aspect of the present disclosure, an image processing method is provided, which comprises: obtaining an image dataset, the image dataset comprising an image and an accompanying text related to an unseen class in the image; and generating a probability and/or distribution of the unseen class using an unseen class obtaining model, the probability and/or distribution of the unseen class comprising a probability that each pixel in the image is from the unseen class, a probability that the unseen class is present in the image, and a regional probability after the image is subdivided into a plurality of regions.

According to an example of the present disclosure, the unseen class obtaining model comprises a local branch, a semi-global branch, and a global branch, wherein the local branch is configured to generate the probability that each pixel in the image is from the unseen class based on annotation information of a seen class, the global branch is configured to generate the probability that the unseen class is present in the image based on the accompanying text, the semi-global branch is configured to generate the regional probability after the image is subdivided into the plurality of regions based on the annotation information and the accompanying text.

According to an example of the present disclosure, the global branch uses a text semantic extraction model to generate the probability that the unseen class is present in the image based on the accompanying text.

According to an example of the present disclosure, the text semantic extraction model is a bidirectional encoder representation from transformer (BERT) model, wherein generating the probability that the unseen class is present in the image using the BERT model is represented as $$s_{x,c} = \text{sigmoid}(H_o(\phi(\text{caption}(x);[\text{EOS}];\text{description}(c))))$$

wherein $H_o(\cdot)$ represents a freely defined function whose output is the probability that the unseen class is present in the image without being processed by a sigmoid function, $\phi$ represents the BERT model, caption(x) represents the accompanying text of the image, EOS is an end of sentence in natural language processing, c represents the unseen class, and description(c) represents a keyword or text description of the unseen class c.

According to an example of the present disclosure, the local branch uses a first model to generate the probability that each pixel in the image is from the unseen class, wherein the first model is obtained through training with the annotation information.

According to an example of the present disclosure, the annotation information comprises coordinates of a pixel of a seen class, and the first model is trained by: selecting a pixel of one seen class of a plurality of seen classes in one image in the image dataset as one verification data in a verification set; selecting a pixel of another class of the plurality of seen classes as one training data in a training set; and training the first model based on coordinates of pixels of seen classes in the verification set and the training set.

According to an example of the present disclosure, the semi-global branch generates the regional probability using a second model, which is obtained through training with the accompanying text and the annotation information.

According to an example of the present disclosure, the regional probability comprises a first probability distribution that each pixel in each image subdivision region of a plurality of image subdivision regions generated after the image is subdivided into the plurality of regions is from the unseen class and a second probability distribution that the unseen class is present in each image subdivision region.

According to an example of the present disclosure, the second model is trained by: subdividing the image into the plurality of regions in a vertical direction or a horizontal direction; generating a first training probability distribution that the unseen class is present in each image subdivision region based on the accompanying text; generating a second training probability distribution that each pixel in each image subdivision region of the plurality of image subdivision regions is from the unseen class based on the annotation information; constructing a loss function according to the first training probability distribution and the second training probability distribution; and training the second model with the loss function.

According to an example of the present disclosure, the constructing the loss function according to the first training probability distribution and the second training probability distribution comprises: constructing loss function image processing based on a Euclidean distance between the first training probability distribution and the second training probability distribution.

According to one example of the present disclosure, the accompanying text comprises a user comment and/or an image caption.

According to one aspect of the present disclosure, an image segmentation method is provided, which comprises: obtaining a first image; and processing the first image using an image segmentation model to generate a segmented second image, wherein the image segmentation model is obtained by training an original image segmentation network using a first training set, and the first training set comprises a probability and/or distribution of an unseen class obtained using the image processing method, and wherein the second image comprises a plurality of regions corresponding to different classes.

According to one aspect of the present disclosure, an image processing apparatus is provided, which comprises:

an obtaining unit, configured to obtain an image dataset, the image dataset comprising an image and an accompanying text related to an unseen class in the image; and a generating unit, configured to generate a probability and/or distribution of the unseen class using an unseen class obtaining model, the probability and/or distribution of the unseen class comprising a probability that each pixel in the image is from the unseen class, a probability that the unseen class is present in the image, and a regional probability after the image is subdivided into a plurality of regions.

According to an example of the present disclosure, the unseen class obtaining model comprises a local branch, a semi-global branch, and a global branch, wherein the local branch is configured to generate the probability that each pixel in the image is from the unseen class based on annotation information of a seen class, the global branch is configured to generate the probability that the unseen class is present in the image based on the accompanying text, the semi-global branch is configured to generate the regional probability after the image is subdivided into the plurality of regions based on the annotation information and the accompanying text.

According to one aspect of the present disclosure, an image processing device is provided, which comprises: a processor; and a memory in which computer-readable instructions are stored, wherein the computer-readable instructions, when executed by the processor, execute an image processing method, the method comprising: obtaining an image dataset, the image dataset comprising an image and an accompanying text related to an unseen class in the image; and generating a probability and/or distribution of the unseen class using an unseen class obtaining model, the probability and/or distribution of the unseen class comprising a probability that each pixel in the image is from the unseen class, a probability that the unseen class is present in the image, and a regional probability after the image is subdivided into a plurality of regions.

According to one aspect of the present disclosure, a computer-readable storage medium is provided for storing a computer-readable program that causes a computer to execute the image processing method described above.

It is to be understood that both the foregoing general description and the following detailed description are exemplary and are intended to provide further explanation of the claimed technology.

BRIEF DESCRIPTION OF THE DRAWINGS

The above and other objects, features and advantages of the present disclosure will become more apparent by describing the embodiments of the present disclosure in more detail with reference to the accompanying drawings. The drawings are used to provide a further understanding of the embodiments of the present disclosure, form a part of the specification to be used to explain the present disclosure together with the embodiments of the present disclosure, and do not constitute a limitation on the present disclosure. In the drawings, the same reference numerals generally represent the same components or steps.

DESCRIPTION OF THE EMBODIMENTS

Figure 1:
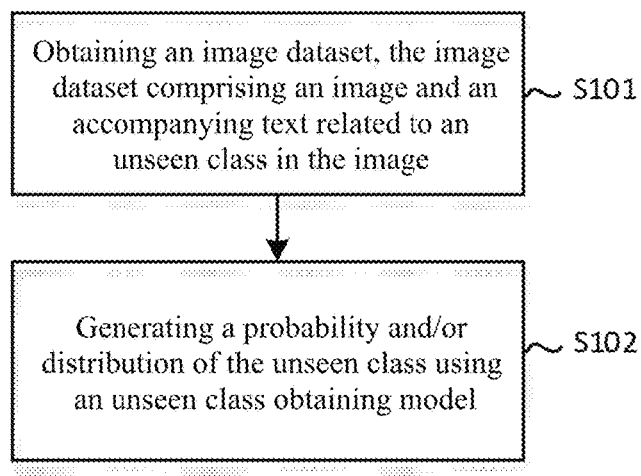
FIG. 1 shows a flowchart of an image processing method according to embodiments of the present disclosure.

In the following, technical solutions in the embodiments of the present disclosure will be clearly and completely described with reference to the accompanying drawings in the embodiments of the present disclosure. Obviously, the described embodiments are only parts of the embodiments of the present disclosure, not all the embodiments. Based on the embodiments in the present disclosure, all other embodiments obtained by the ordinary skilled in the art without creative labor are within the scope of protection of the present disclosure.

The words "first", "second" and similar words used in the present disclosure do not indicate any order, quantity or importance, but are only used to distinguish different components. Similarly, the word "including" or "comprising" and similar words mean that the elements or objects appearing before the word cover the elements or objects listed after the word and their equivalents, but do not exclude other elements or objects. The word "connected" or "inter-connected" and similar words are not limited to physical or mechanical connections, but may include electrical connections, whether direct or indirect. The words "up", "down", "left" and "right" are only used to indicate the relative positional relationship. When the absolute position of the described object changes, the relative positional relationship may also change accordingly.

Flowcharts are used in the present application to illustrate the steps of the methods according to embodiments of the present application. It should be understood that the preceding or following steps are not necessarily performed exactly in order. Instead, various steps may be processed in reverse order or simultaneously. At the same time, other operations may also be added to these processes, or a step or steps maybe removed from these processes.

In a standard image segmentation technology, an image segmentation model is obtained by collecting a large number of training images in advance and performing pixel-level semantic annotation, and then obtaining optimal parameters of the model through machine learning. Semantic annotation in image segmentation task is very labor-intensive, which seriously restricts a scale of training data for the task. When deploying an image segmentation model to a new application scenario, a new unseen class (or termed as low-shot or zero-shot) is often encountered. Semantic annotations of these unseen classes are extremely rare and may be completely missing in some cases. A low-shot image segmentation task (or termed as unseen class image segmentation task) aims at obtaining an image segmentation model capable of handling new classes from low-shot (or zero-shot) data.

Existing image segmentation models are usually obtained based on machine learning, which rely heavily on pixel-level semantic annotation and consume a lot of manpower. When using an image segmentation model trained by a specific dataset in a new application scenario, pixel-level semantic annotation needs to be performed again for the new unseen class in the scenario.

The present disclosure provides an image processing method, which generates a probability and/or distribution of the unseen class using an unseen class obtaining model including local branch, semi-global branch and global branch, and trains an image segmentation network using the probability and/or distribution of the unseen class as training data, so as to automatically annotate the unseen class in the image using the image segmentation network without being provided with pixel-level semantic annotations of the unseen class, thereby saving a great deal of labor cost and time.

Embodiments and examples of the present disclosure will be described in detail below with reference to the accompanying drawings.

At least one embodiment of the present disclosure provides an image processing method, an image processing apparatus, an image processing device and a computer-readable storage medium. The image processing method provided according to at least one embodiment of the present disclosure will be described in a non-limiting way through several examples and embodiments below. As described below, without conflicting with each other, different features in these specific examples and embodiments may be combined with each other to obtain new examples and embodiments, which also belong to the scope of protection of the present disclosure.

The image processing method according to embodiments of the present disclosure will be described below with reference to FIGS. 1-6. First, the image processing method according to embodiments of the present disclosure will be described with reference to FIG. 1. The method may be automatically performed by a computer or the like. For example, the image processing method may be implemented in software, hardware, firmware or any combination thereof, and loaded and performed by processors in devices such as mobile phones, tablet computers, notebook computers, desktop computers and network servers.

For example, the image processing method may be applied to a computing apparatus, which may be any electronic device with computing capabilities such as a mobile phone, a notebook computer, a tablet computer, a desktop computer, a network server, etc., and may load and perform the image processing method, which is not limited by the embodiments of the present disclosure. For example, the computing apparatus may include other forms of processing units with data processing capability and/or instruction execution capability, such as Central Processing Unit (CPU) or Graphics Processing Unit (GPU) as well as storage units, etc., and the computing apparatus is also installed with an operating system and application programming interface (e.g., Open Graphics Library (OpenGL), Metal, etc.), etc., so as to run codes or instructions to implement the image processing method provided by the embodiments of the present disclosure. For example, the computing apparatus may also include display components, such as Liquid Crystal Display (LCD), Organic Light Emitting Diode (OLED) Display, Quantum Dot Light Emitting Diode (QLED), projection components, VR head-mounted display devices (such as VR helmets, VR glasses), etc, which is not limited by the embodiments of the present disclosure. For example, the display component may display an object to be displayed.

As shown in FIG. 1, the image processing method includes the following steps S101-S102. The image processing described in the present disclosure may include image digitization, image encoding, image enhancement, image restoration, image segmentation and image analysis, etc., which are not limited herein. Next, the present disclosure is illustrated by taking image segmentation as an example.

At step S101, an image dataset is obtained, which includes an image and an accompanying text related to an unseen class in the image.

At step S102, an unseen class obtaining model is used to generate a probability and/or distribution of the unseen class, the probability and/or distribution of the unseen class includes a probability that each pixel in the image is from the unseen class, a probability that the unseen class is present in the image, and a regional probability after the image is subdivided into a plurality of regions. Regarding step S101, for example, the image dataset usually includes a certain accompanying text, such as a user comment, an image caption, etc. under an image of a social networking site. The accompanying text in the method described in the present disclosure takes the image caption as an example to show the use of the accompanying text for low-shot image processing. It should be understood that the present disclosure may include other forms of accompanying text for an image, and there is no limit thereto.

For example, when the unseen class is guitar, the image caption "people in black short sleeves is playing guitar" is related to the unseen class "guitar", the image caption "people in black short sleeves is playing piano" is unrelated to the unseen class "guitar", and the image caption "people in black short sleeves is playing musical instruments" may be related to the unseen class "guitar".

Figure 2:
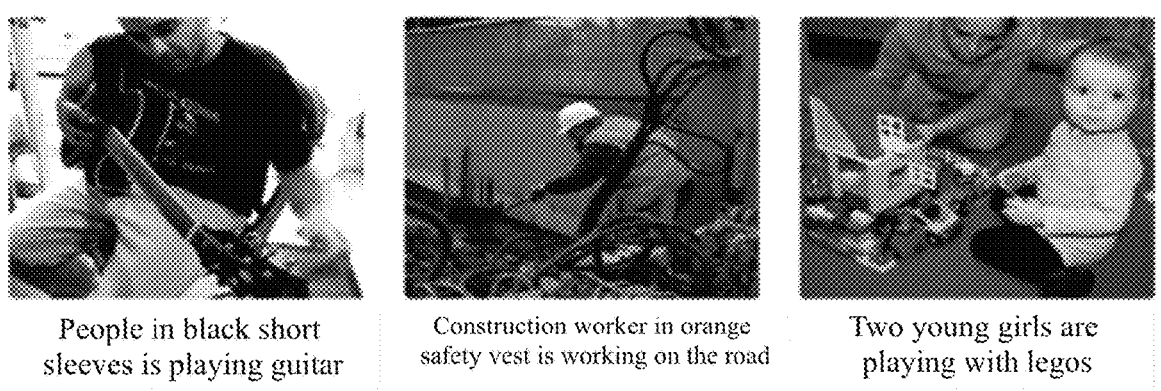
FIG. 2 shows a schematic diagram of an example of image accompanying text according to embodiments of the present disclosure.

FIG. 2 shows some examples of image captions. The image caption is usually a sentence describing the most critical semantic content in the image. When it is necessary to process a certain unseen class of image processing, the image caption is useful in the following situations: 1) the caption directly includes keywords of the unseen class; 2) the probability that the unseen class is present in the image may be implicitly deduced from the caption.

Regarding step S102, for example, the unseen class obtaining model may include a local branch, a semi-global branch, and a global branch. The local branch, the semi-global branch and the global branch may correspond to different modules.

For example, the local branch may be configured to generate the probability that each pixel in the image is from the unseen class based on annotation information of a seen class, the global branch may be configured to generate the probability that the unseen class is present in the image based on the accompanying text, the semi-global branch may be configured to generate the regional probability after the image is subdivided into the plurality of regions based on the annotation information and the accompanying text.

Figure 3:
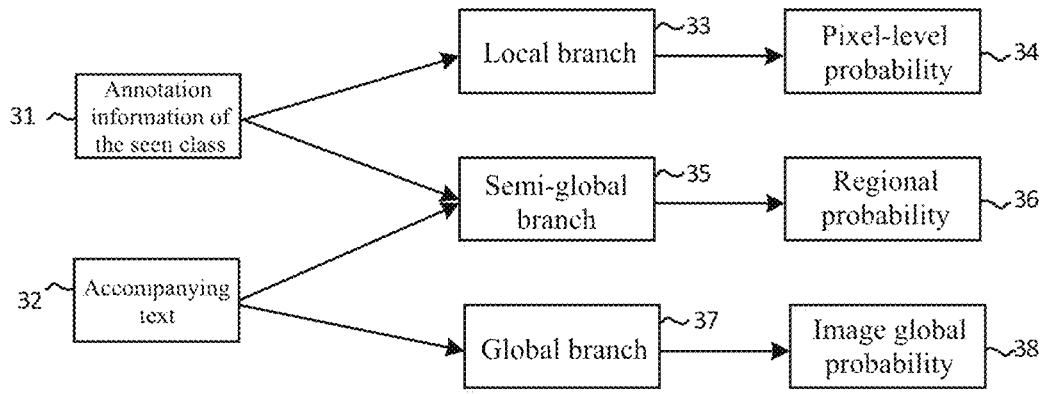
FIG. 3 shows a schematic diagram of an annotation method for an unseen class according to embodiments of the present disclosure.

FIG. 3 is a schematic diagram of an annotation method for the unseen class according to embodiments of the present disclosure. As shown in FIG. 3, the image processing method of the present disclosure uses the image processing model including local branch 33, semi-global branch 34 and global branch 35 to generate the probability that the unseen class is present at different levels (for example, pixel level, image subdivision region level, image global level) by repeatedly using existing annotation information 31 of the seen class and using accompanying text 32 of the image. For example, as shown in FIG. 3, the local branch 33 generates the probability that each pixel in the image is from the unseen class based on the annotation information 31 of the seen class (pixel-level probability 34), the global branch 37 generates the probability that the unseen class is present in the image based on the accompanying text 32 (image global probability 38), and the semi-global branch 35 generates the regional probability 36 after the image is subdivided into a plurality of regions based on the annotation information 31 and the accompanying text 32.

The annotation method for the unseen class using the image processing model which includes the local branch 33, the semi-global branch 34 and the global branch 35 according to the disclosed embodiment will be described in detail below with reference to FIGS. 4-5.

First, the operation of the global branch (global branch 37 in FIG. 3) according to the embodiments of the present disclosure will be described.

For example, the global branch may use a text semantic extraction model to generate the probability that the unseen class is present in the image based on the accompanying text.

For example, a context-sensitive pre-trained text semantic extraction model, such as a bidirectional encoder representation from transformer (BERT) model, may be used to deal with the following contextual implication question (CEQ) in the accompanying text:

CEQ(x,c):caption(x); [EOS]; description(c).

In the above CEQ, x represents a specific image, caption (x) represents the accompanying text (such as, text caption) of the image. EOS is an end of sentence in natural language processing, c represents the unseen class, and description(c) represents a keyword or text description of the unseen class c.

The training process of BERT model includes tasks related to the context-based entailment relationship between sentences. Therefore, after the above CEQ is transferred to a deep network model such as the BERT model, the high-level output thereof will include judgments for the entailment relationship.

For example, a pair of premise and hypothesis sentences may be divided into three classes: contradiction, neutral and entailment. For example, "a football match with many men" means "some men are taking part in a sport", which contradicts "no men are moving in the image". The objective of the above CEQ is to predict the relationship between premise and hypothesis, which may be either an entailment relationship or a contradiction relationship. If it is judged a high entailment relationship, it means that the unseen class c is semantically consistent with the image caption.

In addition, parameters may be introduced to control the judgment for the entailment relationship mentioned above. For example, in BERT model, we may average or maximize pooling of the feature vectors output by the high-level neural network layer to obtain a single feature vector, and obtain a probability of the final entailment relationship through additional parameterized network layer (such as a fully-connected layer).

For example, a range of CEQ may be widened to [0,1], and the relationship between premise and hypothesis may be predicted by converting the range into binary classification with confidence modulation. This may be achieved by appending a fully-connected head (represented by $H_o(\cdot)$) on top of a backbone of the BERT model. Let $s_{x,c}$ be the probability that the unseen class c is present in the image x, and its calculation equation is:

$$s_{x,c} = \text{sigmoid}(H_o(\phi(\text{caption}(x);[\text{EOS}];\text{description}(c)))) \quad (1)$$

Here, $H_o(\cdot)$ represents a freely defined function which is not limited herein, and its output is the probability that a particular class is present in the image (without being processed by the sigmoid( )). $\phi$ represents the BERT model. An output of an activation function sigmoid( ) is located in the [0,1] interval, as a probability output. x represents an input image of the BERT model. It should be appreciated that the above activation function sigmoid( ) is only an example, and activation functions such as softmax, tanh, etc. may also be used, which are not limited herein.

For example, based on the seen class S, a binary cross entropy loss may be used to optimize the head $H_o$ and $\phi$, as follows:

$$L_o = \Sigma_x \Sigma_{c \in S} -[I(c \in y(x)) \cdot \log(s_{x,c}) + (1 - I(c \in y(x))) \cdot \log(1 - s_{x,c}))] \quad (2)$$

Here, y (x) is a label of the image x, and s represents the seen class. If the unseen class c is present in that particular image x, an indicator function $I(c \in y(x))$ returns 1, otherwise it returns 0.

For example, in the process of training the BERT model using the above-mentioned loss function (2), one seen class may be randomly simulated as an unseen class so as to be used as verification data in a verification set, other classes in the seen classes may be used as training data in a training set, and the BERT model may be trained based on the unseen class in the verification set (formed from simulating the seen class) and the seen classes in the training set. Through the above model, the probability that the unseen class is present in the image may be generated.

In addition, a neural network model based on BERT may be obtained by training the neural network with the loss function of equation (2), and the probability that the unseen class is present in the image maybe obtained through the neural network model. It should be appreciated that the BERT model mentioned above is only an example, and other suitable text semantic extraction models maybe adopted in the present disclosure, which is not limited herein.

Through the global branch of the present disclosure, the probability that the unseen classes is present in the image maybe generated without being provided with the annotation of the unseen class, thereby saving a great deal of labor cost and time.

After describing the operation of the global branch according to the embodiments of the present disclosure, in the following, the operation of the local branch (local branch 33 in FIG. 3) according to the embodiments of the present disclosure will be described.

For example, the local branch may use a first model to generate the probability that each pixel in the image is from the unseen class, where the first model is obtained through training with the annotation information.

For example, there may be semantic correlation between different semantic classes, such as "beach" and "sea water", "blue sky" and "white clouds", etc. For the annotation of the unseen class, all useful information should be used to overcome the lack of annotation quantity. The first model proposed in the present disclosure maybe implemented as a multi-layer perceptron network, for example, which may be obtained through training with annotation information.

For example, the detailed description of the first model is as follows. (1) The training set includes a certain number of seen classes. Most of these classes have sufficient pixel-level semantic annotations, and standard machine learning models (such as encoding-decoding networks based on convolution and pooling operations, etc.) maybe used to obtain high-quality image processing models. In other words, for a given certain image, each pixel therein may be provided with the probability of a seen class with high reliability. (2) By using word embedding technology (such as word2vec), each class of keywords may be feature-vectorized. (3) The first model may be trained with the annotation information of the seen class to generate the probability that each pixel in the image is from the unseen class.

Figure 4:
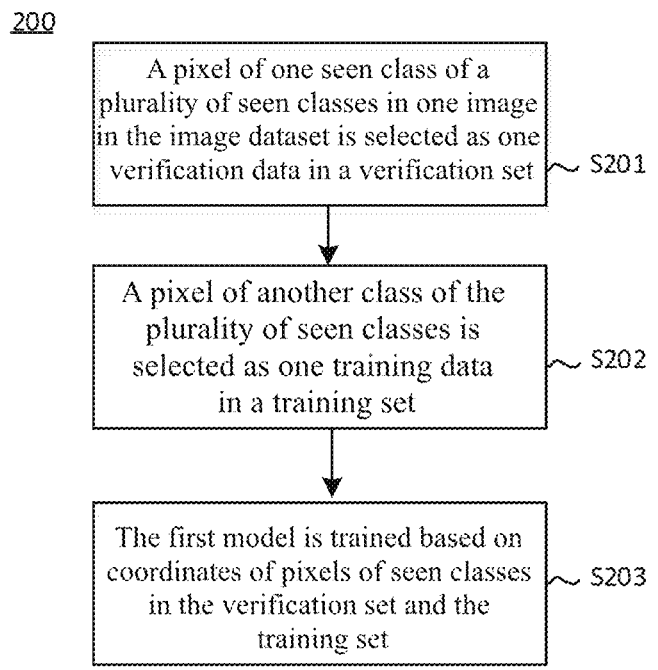
FIG. 4 shows a flowchart of an operation of training a first model according to embodiments of the present disclosure.

FIG. 4 is a flowchart of operation 200 for training the first model according to embodiments of the present disclosure. The operation for training the first model includes the following steps S201-S203.

At step S201, a pixel of one seen class of a plurality of seen classes in one image in the image dataset is selected as one verification data in the verification set.

At step S202, a pixel of another class of the plurality of seen classes is selected as one training data in the training set.

In step S203, the first model is trained based on coordinates of pixels of seen classes in the verification set and the training set.

For example, the annotation information includes the coordinates of pixels of seen classes. The probability that each pixel in the image is from the unseen class may be generated through the following first model M.

Given an image x, the pixel-level first model M of the present disclosure samples a source pixel s of a seen class from a labeled pixel x' and an unlabeled target pixel t of all seen classes. $e_s$ represents the class of the source pixel s. Since it is known in the first model that the source pixel s belongs to the seen classes, $e_s \in S$. S represents the seen classes and U represents the unseen classes. Then, a probability that the class of an unlabeled target pixel t belongs to the unseen classes ($e_t = u \in U$) is:

$$P(e_t=u|x,e_s)=M(\text{position}(s),\text{position}(t),w_{e_s},w_u) \quad (3)$$

Here, position(p) represents two-dimensional coordinates of pixel p, and its dimension is [0,1]. $w_e \in R^d$ is the word embedding related to class e (that is, the feature vector after passing through a model such as word2vec), $w_{e_s}$ is the word embedding related to the class $e_s$ of source pixel s and $w_u$ is the word embedding related to class u ($u \in U$).

Further, a spatial distribution of the unseen class u ($u \in U$) may be obtained by integrating prediction results obtained from all labeled pixels:

$$P(e_t=u|x)=\Sigma_{s\in x'}M(\text{position}(s),\text{position}(t),w_{e_s},w_u)/|x'| \quad (4)$$

Here, |x'| is the number of labeled pixels, which may be used as a rescaling factor. In this way, the pixel-level annotations of seen classes may be used to generate the spatial distribution of a certain unseen class.

For example, the first model may be trained with annotation information of seen classes. For example, in each iteration, a pixel of one seen class may be randomly selected to be simulated as a pixel of an unseen class, so as to be used as one verification data in the verification set, and a pixel of another class in the seen classes may be selected as one training data in the training set. The first model M may be trained based on coordinates of pixels of seen classes in the verification set and the training set.

Through the above-mentioned first model M, the probability that each pixel in the image is from the unseen class may be generated. It should be appreciated that the above-mentioned first model M is only an example, and other suitable first models may also be adopted in the present disclosure, which is not limited herein.

Through the local branch disclosed in the present disclosure, training may be carried out with annotation information of seen classes, and the spatial distribution of the unseen class may be generated without being provided with annotations of the unseen class, thereby saving a great deal of labor cost and time.

After describing the operations of the global branch and the local branch according to the embodiments of the present disclosure, in the following, the operation of the semi-global branch (semi-global 34 in FIG. 3) according to the embodiments of the present disclosure will be described.

The spatial arrangement of different objects is very important for image processing. For example, at least two hints may be used to guess the position of an object in the image. The first hint is the structural arrangement between objects. For example, "people" are usually observed in front of a "desk", while "giraffe" is rarely observed in front of a "desk". Secondly, some objects or concepts tend to have concentrated spatial distribution, for example, "the sky" is often seen in the top region of the image.

As mentioned above, the context entailment in the pre-trained text semantic extraction model in the global branch takes the accompanying text of the image (including global semantic information) as input, while the pixel-level first model in the local branch takes the pixel-level annotations of seen classes (including local class information) as input. In order to make the two kinds of information complement each other in different ways and scales, the present disclosure proposes to jointly train the global branch and the local branch with consistency loss.

As described above, the semi-global branch is configured to generate the regional probability after the image is subdivided into the plurality of regions based on the annotation information and the accompanying text.

For example, the semi-global branch may generate the regional probability using a second model, which is obtained through training with the accompanying text and the annotation information.

For example, the regional probability includes a first probability distribution that each pixel in each image subdivision region of a plurality of image subdivision regions generated after the image is subdivided into the plurality of regions is from the unseen class and a second probability distribution that the unseen class is present in each image subdivision region.

Figure 5:
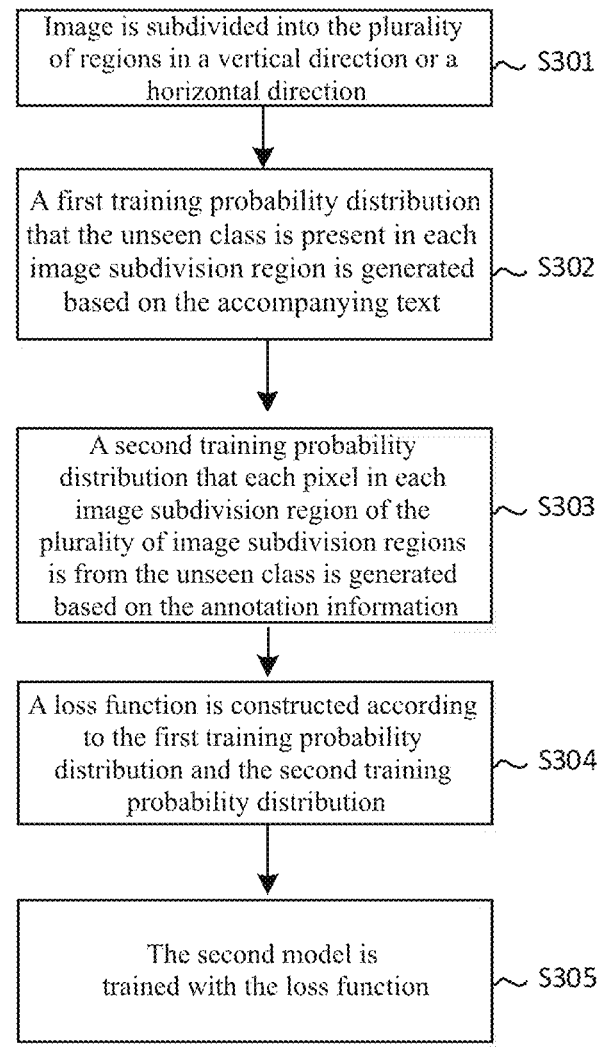
FIG. 5 shows a flowchart of an operation of training a second model according to embodiments of the present disclosure.

FIG. 5 is a flowchart of operation 300 for training the second model according to embodiments of the present disclosure. The operation for training the second model includes the following steps S301-S305.

At step S301, the image is subdivided into the plurality of regions in a vertical direction or a horizontal direction.

At step S302, a first training probability distribution that the unseen class is present in each image subdivision region is generated based on the accompanying text.

At step S303, a second training probability distribution that each pixel in each image subdivision region of the plurality of image subdivision regions is from the unseen class is generated based on the annotation information.

At step S304, a loss function is constructed according to the first training probability distribution and the second training probability distribution.

In step S305, the second model is trained with the loss function.

Regarding step S302, the first training probability distribution may be generated based on the following model.

For example, the present disclosure may generate spatial distribution specific to an image class from an image caption. Suppose that the complex context in the caption may roughly tell the position of the object. The realization of this idea is still based on customization of the BERT model. In most cases, the image and its vertically inverted version may be described with the same caption, but this may complicate a prediction of a horizontal position of the object. Therefore, preferably, the model of the present disclosure only focuses on certain objects in a vertically positioned image. In particular, all images will be segmented into vertical regions of equal length. It should be understood that the image may also be subdivided into a plurality of regions of different sizes, which is not limited herein.

For example, for an image x, suppose that the image x is subdivided into k regions with equal intervals in the vertical direction, and let $g_{x,c}^{(k)}$, be the number of pixels in the image classified as an unseen class c in the $k^{th}$ (k=1 ... K) region, so that the distribution $V_{x,c}$ of the unseen class c in all subdivided regions may be obtained, which is $$V_{x,c}=\{q_{x,c}^{(k)}|k=1 \ldots K\}=\{g_{x,c}^{(k)}/\Sigma_k g_{x,c}^{(k)}|k=1 \ldots K\} \quad (5)$$

Here, $q_{x,c}^{(k)}$ is normalized $g_{x,c}^{(k)}$.

In addition, another head $H_s(\cdot)$ may be appended to the backbone of the BERT model, and a softmax with K outputs may be placed at the end of the BERT model, so that the BERT model may be designed to estimate the spatial distribution of a certain unseen class c in the image x (that is, the distribution in the subdivision regions obtained by processing the image accompanying text through the BERT model), which is also called the first training probability distribution:

$$\hat{V}_{x,c} = \{\hat{q}_{x,c}^{(k)} \mid k = 1 \ldots K\} = \quad (6)$$
$$\text{softmax}(H_s(\phi(\text{caption }(x);[EOS]; \text{description }(c))))$$

Here, $H_s(\cdot)$ represents a freely defined function, which is not limited herein. It should be appreciated that the activation function of softmax is just an example, and activation functions such as sigmoid, tanh, etc. may also be adopted, which is not limited herein.

In addition, the BERT model may be trained by the following loss function L. For example, by fine-tuning the BERT model, image-specific classes of visual events and spatial distribution may be pursued with a unified optimization objective L:

$$L=L_o+L_s \quad (7)$$

In the training process, $H_s(\cdot)$ is iteratively optimized by minimizing (by constructing the loss function) distribution differences between the corresponding pairs of $V_{x,c}$ and $\hat{V}_{x,c}$ of all seen classes in the seen classes. For example, the loss function $L_s$ may be implemented with information entropy objective:

$$L_s=\Sigma_{x\in P}\Sigma_{c\in S}\Sigma_{k=1 \ldots K}-\hat{q}_{x,c}^{(k)}\log(q_{x,c}^{(k)}) \quad (8)$$

Here, $H_o(\cdot)$ and $H_s(\cdot)$ controlled by $L_o+L_s$ are complementary to each other. Here, $g_{x,c}^{(k)}$ is the number of pixels in the image x classified as an unseen class c in the $k^{th}$ (k=1 ... K) region in the image, $q_{x,c}^{(k)}$ is normalized $g_{x,c}^{(k)}$ and $\hat{q}_{x,c}^{(k)}$ is the spatial distribution (or the first training probability distribution) of unseen class c in the $k^{th}$(k=1 ... K) region in the image x.

It should be appreciated that the above-mentioned model for generating the first training probability distribution that the unseen class is present in each image subdivision region based on the accompanying text is not limited thereto, and other suitable models may be used to generate the first training probability distribution, which is not limited herein.

Regarding step S303, the second training probability distribution may be generated based on the following model.

For example, for a certain unseen class u (u∈U) (which may also be expressed as the c mentioned above), the spatial distribution of the unseen class u (u∈U) given based on the first model may be inferred through equation (4). Then, in the following, the pixels in each vertical subdivision region may be averaged (for example, a softmax function with K outputs may be placed at the end of the first model) to obtain the second training probability distribution $\hat{Y}_{x,u}$:

$$\hat{Y}_{x,u}=\{\hat{y}_{x,u}^{(k)}|k=1 \ldots K\}=\text{softmax}\{\Sigma_{t\in \text{strip}(k)}P(e_t=u|x) |k=1 \ldots K\} \quad (9)$$

$\hat{y}_{x,u}^{(k)}$ represents the spatial distribution of the unseen class u in the $k^{th}$ vertical subdivision region, and strip(k) represents the $k^{th}$ vertical subdivision region, k=1 ... K.

Regarding step S304, for example, the following loss function may be constructed according to the $L_2$ distance (Euclidean distance) between the above-mentioned first training probability distribution $\hat{V}_{x,c}$ (equation (6)) (it should be appreciated that in the present disclosure, both c and u (u∈U) may represent an unseen class, so $\hat{V}_{x,c}$ may also be expressed as $\hat{V}_{x,u}$ herein) and the second training probability distribution $\hat{Y}_{x,u}$ (equation (9)):

$$L_{consist}=\Sigma_{x\in P}\Sigma_{u\in U}\|\hat{Y}_{x,u}-\hat{V}_{x,u}\|_2 \quad (10)$$

Finally, in step S305, the constructed second model is trained with the above-mentioned loss function.

It should be appreciated that the above-mentioned model for generating the second training probability distribution that each pixel in each image subdivision region of the plurality of image subdivision regions is from the unseen class based on the annotation information is not limited to thereto, and other suitable models may be used to generate the second training probability distribution, which is not limited herein.

Figure 6:
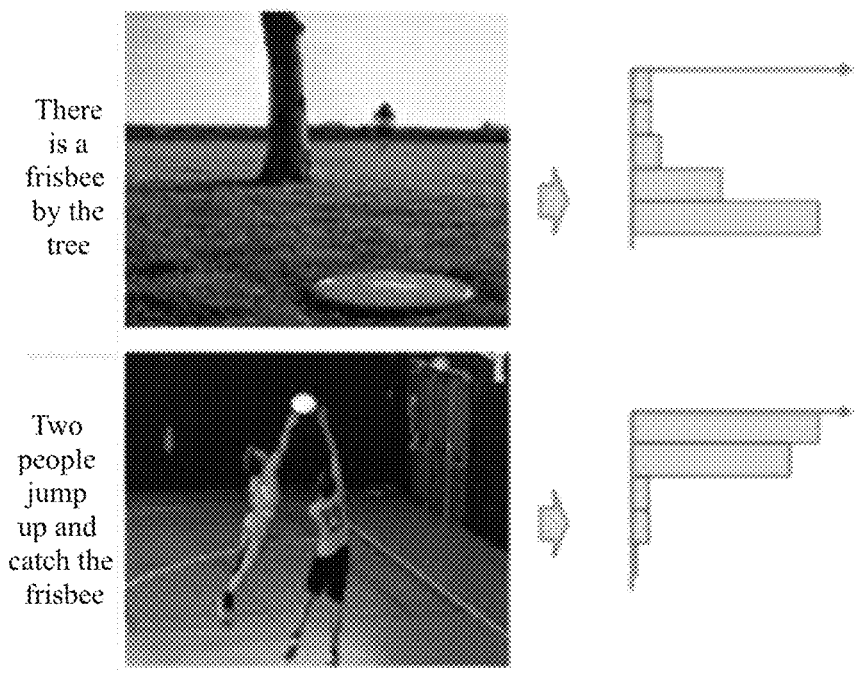
FIG. 6 shows a schematic diagram of an effect of a semi-global branch according to embodiments of the present disclosure.

FIG. 6 shows a schematic diagram of an effect of a semi-global branch according to embodiments of the present disclosure.

FIG. 6 shows the obtained spatial distribution of different classes in the image after the whole image is segmented into vertical regions of equal length according to the second model mentioned above. It may be seen that for the same class of frisbee, the second model of the present disclosure may get different results according to different image captions.

As shown in FIG. 6, the two images on the left side of FIG. 6 are divided into five regions along the vertical direction, and the distribution map on the right side of FIG. 6 shows the corresponding spatial distribution after each image is subdivided into five regions. It may be seen that for the same class of frisbee, the corresponding spatial distribution (upper right side of FIG. 6) of the image on the upper left side of FIG. 6 shows that the probability of the frisbee being in the lower region is higher; and the corresponding spatial distribution (lower right side of FIG. 6) of the image on the lower left side of FIG. 6 shows that the probability of the Frisbee being in the upper region is higher.

It is easy to understand that the first model and the second model according to the embodiments of the present disclosure may adopt different neural network structures, including but not limited to, convolutional neural network, recurrent neural network (RNN) and so on. The convolutional neural network includes, but is not limited to, U-Net neural network, ResNet, DenseNet, etc.

The above describes in detail the generation of the probability and/or distribution of the unseen class using the unseen class obtaining model including the local branch, the semi-global branch and the global branch. Through this method, the probability that each image includes the unseen class may be obtained, including pixel-level probability, image subdivision region level probability and global probability.

Further, the above-mentioned probability information of different levels may be used as a training set, and the optimization objective function of the image segmentation model of unseen class may be constructed by using a deep network such as U-Net as the main body of the model, so that the image segmentation may be performed by training the image segmentation model, and the segmented image may be obtained.

It should be appreciated that the neural network model in the present disclosure may include various neural network models, including but not limited to convolutional neural network (CNN) (including GoogLeNet, AlexNet, VGG network, etc.), region with convolutional neural network (R-CNN), region proposal network (RPN), recurrent neural network (RNN), stack-based deep neural network (S-DNN), deep belief network (DBN), restricted boltzmann machine (RBM), full convolutional network, long-short term memory (LSTM) network, and classification network. In addition, the neural network model for performing a task may include a sub-neural network, and the sub-neural network may include a heterogeneous neural network, and may be implemented by a heterogeneous neural network model.

Figure 7:
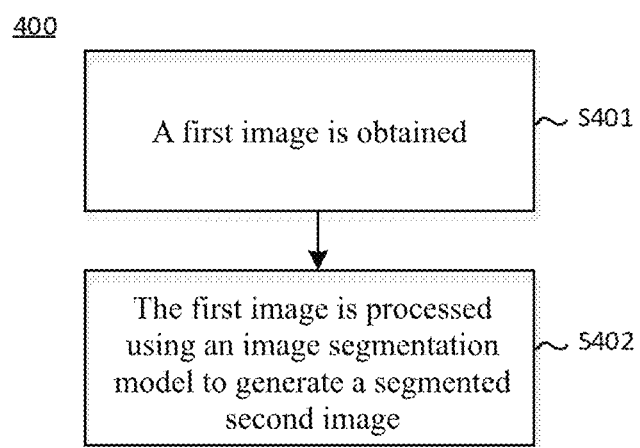
FIG. 7 shows a flowchart of an image segmentation method according to embodiments of the present disclosure.

FIG. 7 shows a flowchart of an image segmentation method according to embodiments of the present disclosure. As shown in FIG. 7, the image segmentation method includes the following steps S401-S402.

At step S401, a first image is obtained.

In step S402, the first image is processed using the image segmentation model to generate a segmented second image.

For example, the first image is the input image of the image segmentation model.

For example, the image segmentation model may be obtained by training the original image segmentation network with a first training set, the first training set includes the probability and/or distribution of the unseen class obtained by the image processing method shown in FIG. 1 mentioned above, and the second image includes a plurality of regions corresponding to different classes.

For example, the image segmentation model of the present disclosure may be convolutional neural network, recurrent neural network (RNN) and the like, which may be trained by constructing a loss function:L $$L=L_{SEG}+\lambda L_{RS} \quad (11)$$

Here, L is the loss function of the image segmentation model, $\lambda$ is a weight factor used to balance a loss function $L_{SEG}$ of a seen classes and a loss function $L_{RS}$ of an unseen class. For example, the loss function $L_{SEG}$ of the seen class may be obtained by currently known technologies, which will not be described in detail herein.

Regarding the loss function $L_{RS}$ of the unseen class, for example, it may be constructed according to the probability of the unseen class obtained based on the above-mentioned semi-global branch and global branch.

For example, the present disclosure may employ pairwise ranking loss to utilize the probability information of the unseen class. Given an image x∈X, it is assumed that the penultimate layer of a typical network of this kind will generate a feature map f=ψ(x), and ψ(·) encapsulates all the neural operations involved. Let f∈$R^{h \times w \times d}$, wherein h×w defines the spatial resolution, d is the extracted feature length, and the prediction in the image segmentation task is performed pixel by pixel. For the image x, since a truth label map y may be accessed, which of course only includes the pixel-level annotations in the seen class S, it is assumed that the unseen class will only be present in the unlabeled part. For a pixel (i,j) in the feature map, Y may be expressed as a set of unlabeled pixel positions:

$$Y=\{(i,j)|y_{i,j} \notin S\} \quad (15)$$

Given a pair of images x1 and x2, encoding feature maps $f_1$ and $f_2$ may be obtained using CNN model φ. And the caption annotations $r_1$ and $r_2$ may be used to generate the occurrence probabilities of specific classes $s_{1,e}$ and $s_{2,e}$ through the unseen class obtaining model of the present disclosure. If $s_{1,e_u} > s_{2,e_u}$, it may be considered that image x1 is more likely to include class $e_u$ than image x2. That is, the unlabeled part Y1 of x1 is more likely to include the unseen class $e_u$ (u∈U) than the unlabeled part Y2 of x2. Therefore, the ranking loss may be written as:

$$L_R = \sum_{e_u \in U} I(s_{1,e}, s_{2,e}) \quad (16)$$
$$\left(\frac{1}{|Y_1|}\sum_{(i,j) \in Y_1} f_1(i,j)^T w_{e_u}^u - \frac{1}{|Y_2|}\sum_{(i,j) \in Y_2} f_2(i,j)^T w_{e_u}^u\right)$$

Here, $I(s_{1,e}, s_{2,e})$ has an indicator function. If $s_{1,e} > s_{2,e}$, $I(s_{1,e}, s_{2,e})=1$, otherwise, −1. $w_{e_u}^u \in R^d$ is a fixed word embedding related to class e∈S∪U (such as using word2vec model), S represents seen classes, U represents unseen classes and $e_u$ represents the class of u(u∈U).

As mentioned above, the spatial distribution of a certain class may also be generated from the caption (that is, the regional probability after the image is subdivided into multiple regions). Intuitively, this kind of information may be used to trim the region where the class is present. By considering the spatial distribution as the weight of each divided region, it may be refined into:

$$L_{RS} = \sum_{e_u \in U} I(s_{1,e}, s_{2,e}) \quad (17)$$
$$\left(\sum_{k \in (1,2,\ldots,N)} \frac{p_{1,k}^{e_u}}{|Y_{1,k}|} \sum_{(i,j) \in Y_{1,k}} f_1(i,j)^T w_{e_u}^u\right) -$$
$$\left(\sum_{k \in (1,2,\ldots,N)} \frac{p_{2,k}^{e_u}}{|Y_{2,k}|} \sum_{(i,j) \in Y_{2,k}} f_2(i,j)^T w_{e_u}^u\right)$$

Here, k∈(1, 2, . . . , N) is an index of the region divided along the vertical direction. $\{p_k^{e_u}|k \in (1, 2, \ldots, N)\}$ is a predicted spatial distribution of class $e_u$ (that is, the regional probability obtained by the above-mentioned global branch).

Alternatively, for example, the loss function of the unseen class may be constructed based on the probabilities of the unseen class obtained through the local branch, the semi-global branch and the global branch, which is not limited herein.

For example, the above image segmentation model may be trained on the server side. In the deployment stage, the trained model needs to be deployed to the client side for use. The dataset needed for the training of neural network model only needs to be stored and used on the server side, and do not need to be deployed on the client side.

It is easy to understand that the neural network model according to the embodiment of the present disclosure may adopt different network structures, including but not limited to convolutional neural network, recurrent neural network (RNN) and so on. The convolutional neural network includes, but is not limited to, U-Net neural network, ResNet, DenseNet, etc.

Figure 8:
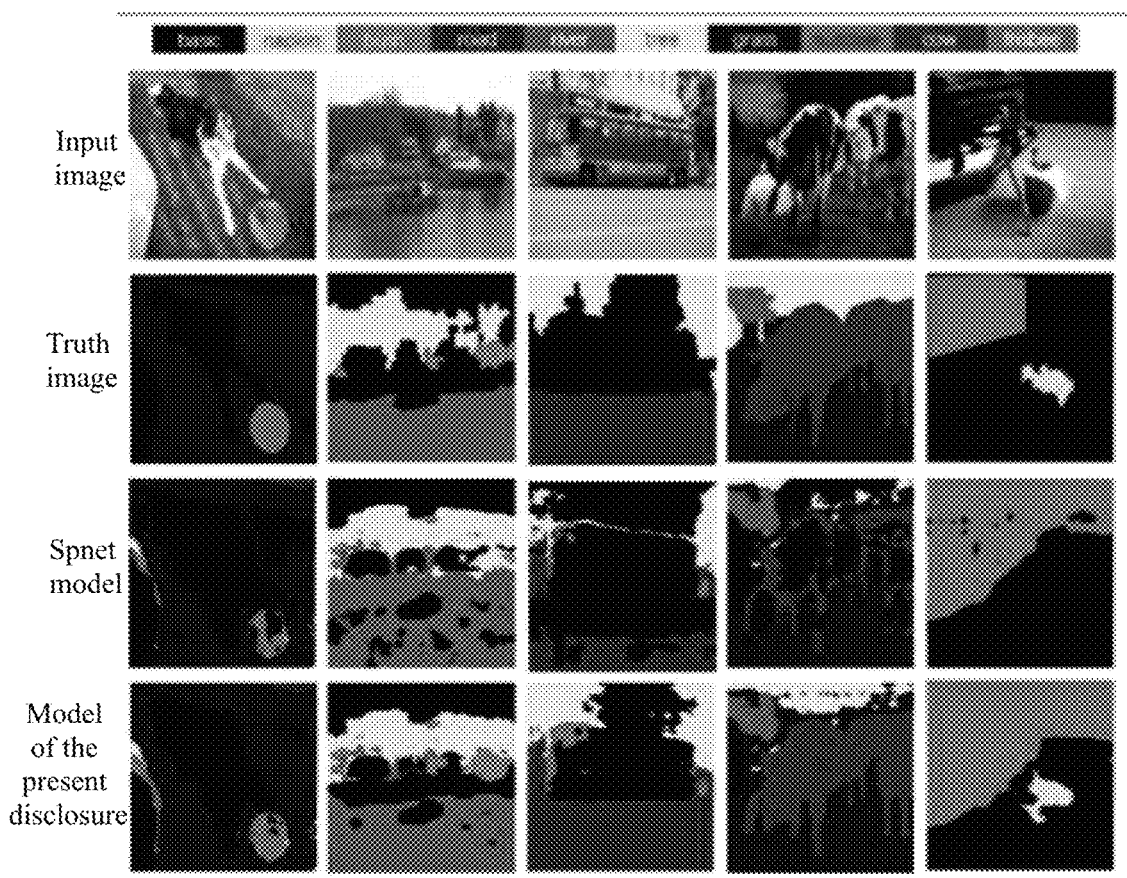
FIG. 8 shows a schematic diagram of a segmented image generated through an image segmentation model according to embodiments of the present disclosure.

FIG. 8 schematically depicts a schematic diagram of a segmented image generated by an image segmentation model according to embodiments of the present disclosure.

As shown in FIG. 8, the input image is five pictures in the first row of FIG. 8, each picture includes different classes (for example, for the first picture, it includes classes of dog, frisbee, grass, etc.). The truth image is a segmented image obtained by segmenting the image with artificial labels, and the segmented image includes regions represented by a plurality of colors corresponding to different classes. It may be seen that, compared with other models (for example, SPNet), the segmented image generated by the image segmentation model of the present disclosure (the last line of FIG. 8) is closer to the truth image and with less noise.

Figure 9:
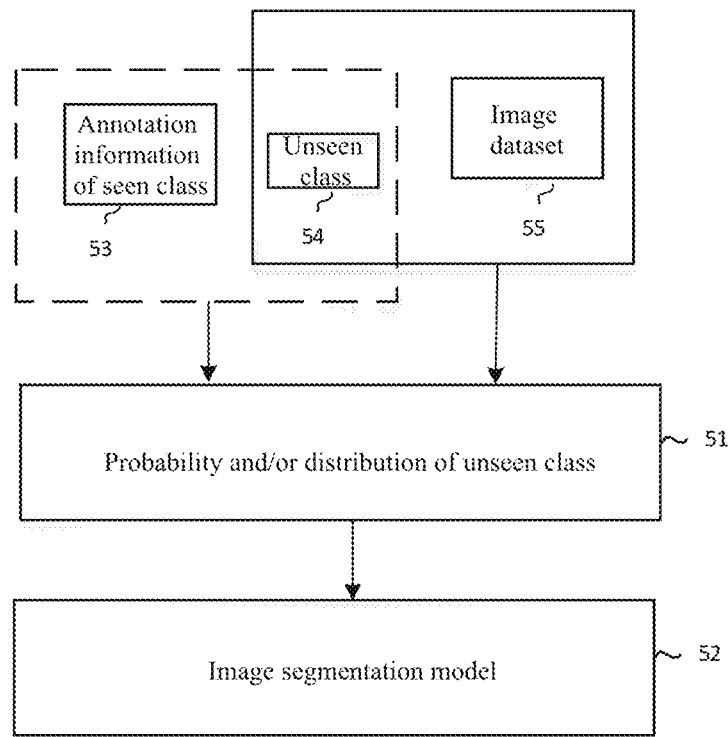
FIG. 9 shows a schematic diagram of a low-shot image segmentation method according to embodiments of the present disclosure.

FIG. 9 is a schematic diagram of a low-shot image segmentation method according to embodiments of the present disclosure. As shown in FIG. 9, the present disclosure uses the unseen class obtaining model to generate the probability and/or distribution of the unseen class 51. The probability and/or distribution of the unseen class includes the probability that each pixel in the image is from the unseen class generated based on the annotation information of the seen class 53, the probability that the unseen class is present in the image generated based on the accompanying text (included in the image dataset 55), and the regional probability after the image is subdivided into multiple regions generated based on the annotation information 53 and the accompanying text (included in the image dataset 55). In the present disclosure, the unseen class 54 is not annotated. Using the probability and/or distribution of the unseen class as training data to train the image segmentation network, an image segmentation model 52 may be obtained, which may be used to segment the input image.

The present disclosure generates the probability and/or distribution of the unseen class using the unseen class obtaining model including the local branch, the semi-global branch and the global branch, and uses the probability and/or distribution of the unseen class as training data to train the image segmentation network, so that the unseen class in the image may be automatically annotated without being provided with pixel-level semantic annotation of the unseen class, the cost of annotation is reduced, and the development cycle is accelerated, thereby saving a great deal of labor cost and time.

Specifically, the present disclosure uses the unseen class obtaining model to perform image processing to generate the probability and/or distribution of the unseen class, and uses the probability and/or distribution of the unseen class as training data to train the image segmentation network, so that the unseen class in the image may be automatically annotated without being provided with pixel-level semantic annotation of the unseen class, saving a great deal of labor cost and time. Further, the present disclosure achieves the effect of improving the image processing model for the same annotation cost or reducing the annotation cost and accelerating the development cycle for the same image processing model by maximizing the use of information in all collected data.

The image processing method according to the embodiments of the present invention has been described above with reference to the drawings. Hereinafter, an image processing apparatus according to embodiments of the present disclosure will be described.

Figure 10:
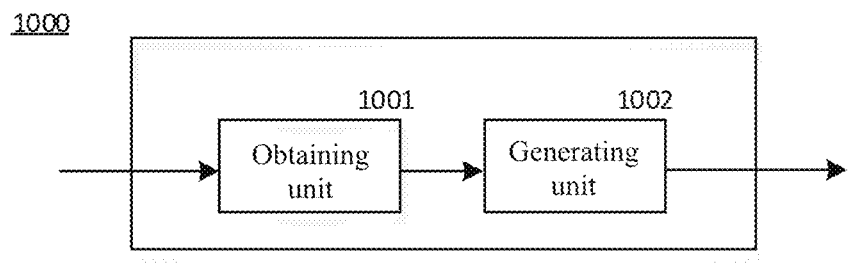
FIG. 10 shows a block diagram of an image processing apparatus according to embodiments of the present disclosure.

FIG. 10 is a functional block diagram illustrating an image processing apparatus according to embodiments of the present disclosure. As shown in FIG. 10, an image processing apparatus 1000 according to the embodiments of the present disclosure includes an obtaining unit 1001 and a generating unit 1002. The above-mentioned modules may respectively perform the steps of the image processing method according to the embodiments of the present disclosure as described above with reference to FIGS. 1 to 9. Those skilled in the art will understand that these unit modules may be implemented in various ways by hardware alone, software alone or a combination thereof, and the present disclosure is not limited to any one of them. For example, these units may be implemented by a central processing unit (CPU), an image processor (GPU), a tensor processor (TPU), a field programmable gate array (FPGA) or other forms of processing units with data processing capability and/or instruction execution capability and corresponding computer instructions.

For example, the obtaining unit 1001 is configured to obtain an image dataset, which includes an image and accompanying text related to an unseen class in the image.

For example, the generating unit 1002 is configured to generate a probability and/or distribution of the unseen class using an unseen class obtaining model, the probability and/or distribution of the unseen class comprising a probability that each pixel in the image is from the unseen class, a probability that the unseen class is present in the image, and a regional probability after the image is subdivided into a plurality of regions.

For example, the image dataset usually includes a certain accompanying text, such as a user comment, an image caption, etc. under an image of a social networking site. The accompanying text in the apparatus described in the present disclosure takes the image caption as an example to show the use of the accompanying text for low-shot image processing. It should be understood that the present disclosure may include other forms of accompanying text for an image, and there is no limit thereto.

For example, the unseen class obtaining model may include a local branch, a semi-global branch, and a global branch. For example, the local branch may be configured to generate the probability that each pixel in the image is from the unseen class based on annotation information of a seen class, the global branch may be configured to generate the probability that the unseen class is present in the image based on the accompanying text, the semi-global branch may be configured to generate the regional probability after the image is subdivided into the plurality of regions based on the annotation information and the accompanying text.

For example, the global branch may use a text semantic extraction model to generate the probability that the unseen class is present in the image based on the accompanying text.

For example, the text semantic extraction model is a bidirectional encoder representation from transformer (BERT) model, wherein generating the probability that the unseen class is present in the image using the BERT model is represented as:

$$s_{x,c} = \text{sigmoid}(H_o(\phi(\text{caption}(x);[\text{EOS}];\text{description}(c)))) \quad (18)$$

Here, $H_o(\cdot)$ represents a freely defined function whose output is the probability that the unseen class is present in the image without being processed by a sigmoid function, $\phi$ represents the BERT model, x represents an input image of the BERT model, caption(x) represents the accompanying text of the image, EOS is an end of sentence in natural language processing, c represents the unseen class, and description(c) represents a keyword or text description of the unseen class c.

For example, the local branch may use a first model to generate the probability that each pixel in the image is from the unseen class, wherein the first model is obtained through training with the annotation information.

For example, the annotation information includes coordinates of a pixel of a seen class, and the first model is trained by: selecting a pixel of one seen class of a plurality of seen classes in one image in the image dataset as one verification data in a verification set; selecting a pixel of another class of the plurality of seen classes as one training data in a training set; and training the first model based on coordinates of pixels of seen classes in the verification set and the training set.

For example, the probability that each pixel in the image is from the unseen class may be generated through the following first model M:

Given an image x, the pixel-level first model M of the present disclosure samples a source pixel s of a seen class from a labeled pixel x' and an unlabeled target pixel t of all seen classes. $e_s$ represents the class of the source pixel s. Since it is known in the first model that the source pixel s belongs to the seen classes, $e_s \in S$. S represents the seen classes and U represents the unseen classes. Then, a probability that the class of the unlabeled target pixel t belongs to the unseen classes ($e_t = u \in U$) is:

$$P(e_t = u | x, e_s) = M(\text{position}(s), \text{position}(t), w_{e_s}, w_u) \quad (19)$$

Here, position(p) represents two-dimensional coordinates of pixel p, and its dimension is [0,1]. $w_e \in R^d$ is the word embedding related to class e (that is, the feature vector after passing through a model such as word2vec), $w_{e_s}$ is the word embedding related to the class $e_s$ of source pixel s and $w_u$ is the word embedding related to class u ($u \in U$).

Further, the spatial distribution of the unseen class u ($u \in U$) may be obtained by integrating the prediction results obtained from all labeled pixels:

$$p(e_t = u | x) = \Sigma_{s \in x'} M(\text{position}(s), \text{position}(t), w_{e_s}, w_u) / |x'| \quad (20)$$

Here |x'| is the number of labeled pixels, which may be used as a rescaling factor. In this way, the pixel-level annotations of seen classes may be used to generate the spatial distribution of a certain unseen class.

For example, the first model may be trained with annotation information of seen classes. For example, in each iteration, a pixel of one seen class may be randomly selected to be simulated as a pixel of an unseen class, so as to be used as one verification data in the verification set, and a pixel of another class in the seen classes may be selected as one training data in the training set. The first model M may be trained based on coordinates of pixels of seen classes in the verification set and the training set.

Through the above-mentioned first model M, the probability that each pixel in the image is from the unseen class may be generated. It should be appreciated that the above-mentioned first model M is only an example, and other suitable first models may also be adopted in the present disclosure, which is not limited herein.

For example, the semi-global branch may generate the regional probability using a second model, which is obtained through training with the accompanying text and the annotation information.

For example, the regional probability includes a first probability distribution that each pixel in each image subdivision region of a plurality of image subdivision regions generated after the image is subdivided into the plurality of regions is from the unseen class and a second probability distribution that the unseen class is present in each image subdivision region.

For example, the second model is trained by: subdividing the image into the plurality of regions in a vertical direction or a horizontal direction; generating a first training probability distribution that the unseen class is present in each image subdivision region based on the accompanying text; generating a second training probability distribution that each pixel in each image subdivision region of the plurality of image subdivision regions is from the unseen class based on the annotation information; constructing a loss function according to the first training probability distribution and the second training probability distribution; and training the second model with the loss function.

For example, the constructing the loss function according to the first training probability distribution and the second training probability distribution comprises: constructing loss function image processing based on a Euclidean distance between the first training probability distribution and the second training probability distribution.

The image processing apparatus of the present disclosure uses the unseen class obtaining model to perform image processing to generate the probability and/or distribution of the unseen class, and uses the probability and/or distribution of the unseen class as training data to train the image segmentation network, so that the unseen class in the image may be automatically annotated without being provided with pixel-level semantic annotation of the unseen class, saving a great deal of labor cost and time. Further, the image processing apparatus of the present disclosure achieves the effect of improving the image processing model for the same annotation cost or reducing the annotation cost and accelerating the development cycle for the same image processing model by maximizing the use of information in all collected data.

Figure 11:
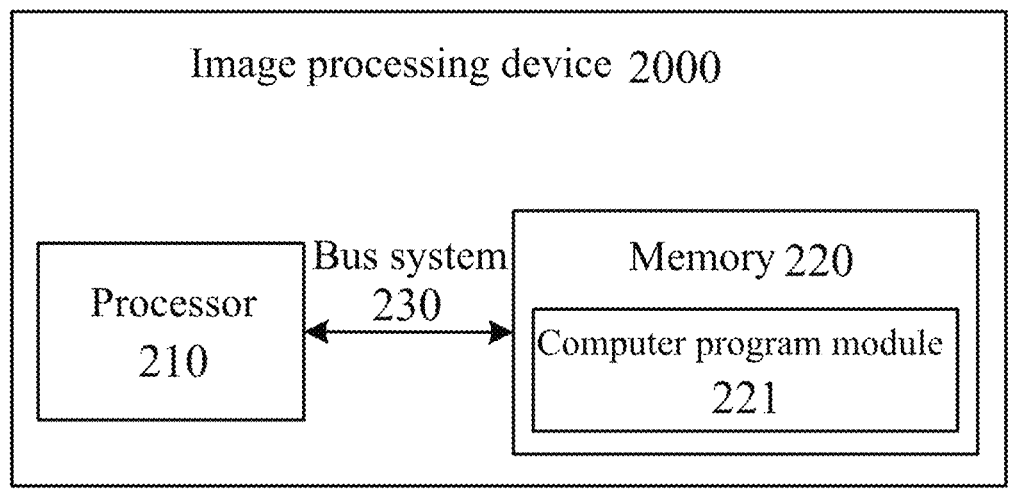
FIG. 11 shows a block diagram of an image processing device according to embodiments of the present disclosure.

An image processing device according to embodiments of the present disclosure will be described below with reference to FIG. 11. FIG. 11 is a schematic diagram of an image processing device 2000 according to embodiments of the present disclosure. Since the details of the image processing device of this embodiment are the same as those of the method described above with reference to FIG. 1, a detailed description of the same contents is omitted here for simplicity.

As shown in FIG. 11, the image processing device 2000 includes a processor 210, a memory 220 and one or more computer program modules 221.

For example, the processor 210 and the memory 220 are connected through a bus system 230. For example, one or more computer program modules 221 are stored in the memory 220. For example, one or more computer program modules 221 include instructions for executing the image processing method provided by any embodiment of the present disclosure. For example, the instructions in one or more computer program modules 221 may be executed by the processor 210. For example, the bus system 230 may be a common serial and parallel communication bus and the like, which is not limited by the embodiment of the present disclosure.

For example, the processor 210 may be a central processing unit (CPU), a digital signal processor (DSP), an image processor (GPU) or other forms of processing units with data processing capability and/or instruction execution capability, may be a general-purpose processor or a special-purpose processor, and may control other components in the image processing device 2000 to perform desired functions.

The memory 220 may include one or more computer program products, which may include various forms of computer-readable storage media, such as volatile memory and/or nonvolatile memory. The volatile memory may include, for example, random access memory (RAM) and/or cache. The nonvolatile memory may include, for example, a read-only memory (ROM), a hard disk, a flash memory, etc. One or more computer program instructions may be stored on the computer-readable storage medium, and the processor 210 may run the program instructions to implement the functions (implemented by the processor 210) and/or other desired functions, such as the image processing method, etc. Various application programs and various data may also be stored in the computer-readable storage medium, such as the element features of the image dataset, the first model, and various data used and/or generated by the application programs.

It should be noted that, for the sake of clarity and conciseness, the embodiments of the present disclosure does not show all the constituent units of the image processing device 2000. In order to implement the necessary functions of the image processing device 2000, the skilled in the art may provide and set other constituent components not shown according to specific needs, which is not limited by the embodiment of the present disclosure.

Regarding the technical effects of the image processing apparatus 1000 and the image processing device 2000 in different embodiments, please refer to the technical effects of the image processing methods provided in the embodiments of the present disclosure, which will not be repeated here.

The image processing apparatus 1000 and the image processing device 2000 may be used in various suitable electronic devices.

Figure 12:
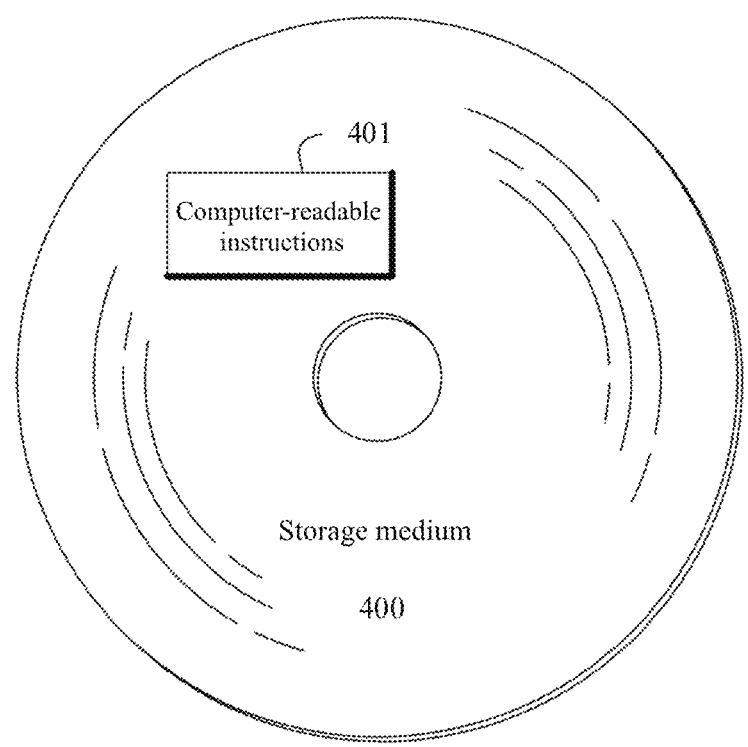
FIG. 12 shows a schematic diagram of a storage medium according to embodiments of the present disclosure.

At least one embodiment of the present disclosure also provides a computer-readable storage medium for storing computer-readable programs. FIG. 12 is a schematic diagram of a storage medium provided by at least one embodiment of the present disclosure. For example, as shown in FIG. 12, the storage medium 400 stores computer-readable instructions 401 in a non-transitory manner, and when the non-transitory computer-readable instructions are executed by a computer (including a processor), the image processing method provided by any embodiment of the present disclosure may be executed.

For example, the storage medium may be any combination of one or more computer-readable storage media. For example, when the program code is read by a computer, the computer may execute the program code stored in the computer storage medium and perform the image processing method provided by any embodiment of the present disclosure, for example.

For example, the storage medium may include a memory card of a smart phone, a storage component of a tablet computer, a hard disk of a personal computer, a random access memory (RAM), a read-only memory (ROM), an erasable programmable read-only memory (EPROM), a portable compact disk read-only memory (CD-ROM), a flash memory, or any combination of the above storage media, or other suitable storage media.

Those skilled in the art may understand that various aspects of the present application may be illustrated and described in terms of a number of patentable classes or circumstances, including any new and useful process, machine, product, or combination of matter, or any new and useful improvement thereto, or any new and useful improvements to them. Accordingly, various aspects of the application may be entirely executed by hardware, entirely executed by software (including firmware, resident software, microcode, etc.), or executed by a combination of hardware and software. The above hardware or software may be referred to as "data block", "module", "engine", "unit", "component" or "system". Furthermore, aspects of the application may be embodied as a computer product located in one or more computer-readable media, the product including computer-readable program codes.

The present application uses specific words to describe the embodiments of the present application. Words such as "one embodiment", "an embodiment" and/or "some embodiments" mean a certain feature, structure or characteristic related to at least one embodiment of the present application. Therefore, it should be emphasized and noted that "one embodiment" or "an embodiment" or "an alternative embodiment" mentioned two or more times in different positions in the specification do not necessarily refer to the same embodiment. In addition, some features, structures or characteristics in one or more embodiments of the present application may be appropriately combined.

Unless otherwise defined, all terms (including technical and scientific terms) used herein have the same meaning as commonly understood by the ordinary in the art to which the present disclosure belongs. It should also be understood that terms such as those defined in general dictionaries should be interpreted as having meanings consistent with their meanings in the context of related technologies, and should not be interpreted in an idealized or highly formalized sense, unless explicitly defined as such herein.

The above is a description of the present disclosure and should not be considered as a limitation thereof. Although several exemplary embodiments of the present disclosure have been described, those skilled in the art will easily understand that many modifications may be made to the exemplary embodiments without departing from the novel teaching and advantages of the present disclosure. Therefore, all these modifications are intended to be included within the scope of the present disclosure as defined by the claims. It should be understood that the above is a description of the present disclosure and should not be considered as limited to the specific embodiments disclosed, and the modification of the disclosed embodiments and other embodiments is intended to be included within the scope of the appended claims. The present disclosure is defined by the claims and their equivalents.

What is claimed is:

1. An image processing method, comprising:
obtaining an image dataset, the image dataset comprising an image and an accompanying text related to an unseen class in the image; and
generating, based on the image dataset, a probability and/or distribution of the unseen class using an unseen class obtaining model, the probability and/or distribution of the unseen class comprising a probability that each pixel in the image is from the unseen class, a probability that the unseen class is present in the image, and a regional probability after the image is subdivided into a plurality of regions.

2. The image processing method of claim 1, wherein,
the unseen class obtaining model comprises a local branch, a semi-global branch, and a global branch,
wherein the local branch is configured to generate the probability that each pixel in the image is from the unseen class based on annotation information of a seen class, the global branch is configured to generate the probability that the unseen class is present in the image based on the accompanying text, the semi-global branch is configured to generate the regional probability after the image is subdivided into the plurality of regions based on the annotation information and the accompanying text.

3. The image processing method of claim 2, wherein,
the global branch uses a text semantic extraction model to generate the probability that the unseen class is present in the image based on the accompanying text.

4. The image processing method of claim 3, wherein the text semantic extraction model is a bidirectional encoder representation from transformer (BERT) model, wherein generating the probability that the unseen class is present in the image using the BERT model is represented as:

$$s_{x,c}=\text{sigmoid}(H_o(\phi(\text{caption}(x);[\text{EOS}];\text{description}(c))))$$

wherein $H_o(\cdot)$ represents a freely defined function whose output is the probability that the unseen class is present in the image without being processed by a sigmoid function, $\phi$ represents the BERT model, x represents an input image of the BERT model, caption(x) represents the accompanying text of the image, EOS is an end of sentence in natural language processing, c represents the unseen class, and description(c) represents a keyword or text description of the unseen class c.

5. The image processing method of claim 2, wherein,
the local branch uses a first model to generate the probability that each pixel in the image is from the unseen class, and wherein the first model is obtained through training with the annotation information.

6. The image processing method of claim 5, wherein the annotation information comprises coordinates of a pixel of a seen class, and the first model is trained by:
selecting a pixel of one seen class of a plurality of seen classes in one image in the image dataset as one verification data in a verification set;
selecting a pixel of another class of the plurality of seen classes as one training data in a training set; and
training the first model based on coordinates of pixels of seen classes in the verification set and the training set.

7. The image processing method of claim 2, wherein the semi-global branch generates the regional probability using a second model, which is obtained through training with the accompanying text and the annotation information.

8. The image processing method of claim 7, wherein the regional probability comprises a first probability distribution that each pixel in each image subdivision region of a plurality of image subdivision regions generated after the image is subdivided into the plurality of regions is from the unseen class and a second probability distribution that the unseen class is present in each image subdivision region.

9. The image processing method of claim 8, wherein the second model is trained by:
subdividing the image into the plurality of regions in a vertical direction or a horizontal direction;
generating a first training probability distribution that the unseen class is present in each image subdivision region based on the accompanying text;
generating a second training probability distribution that each pixel in each image subdivision region of the plurality of image subdivision regions is from the unseen class based on the annotation information;
constructing a loss function according to the first training probability distribution and the second training probability distribution; and
training the second model with the loss function.

10. The image processing method of claim 9, wherein the constructing the loss function according to the first training probability distribution and the second training probability distribution comprises:
constructing loss function image processing based on a Euclidean distance between the first training probability distribution and the second training probability distribution.

11. The image processing method of claim 1, wherein the accompanying text comprises a user comment and/or an image caption.

12. An image processing apparatus, comprising:
a processor; and
a memory having computer-readable program instructions stored therein,
wherein when the computer-readable program instructions are executed by the processor, an image processing method is performed, and the method comprises:
obtaining an image dataset, the image dataset comprising an image and an accompanying text related to an unseen class in the image; and
generating, based on the image dataset, a probability and/or distribution of the unseen class using an unseen class obtaining model, the probability and/or distribution of the unseen class comprising a probability that each pixel in the image is from the unseen class, a probability that the unseen class is present in the image, and a regional probability after the image is subdivided into a plurality of regions.

13. The image processing apparatus of claim 12, wherein,
the unseen class obtaining model comprises a local branch, a semi-global branch, and a global branch,
wherein the local branch is configured to generate the probability that each pixel in the image is from the unseen class based on annotation information of a seen class, the global branch is configured to generate the probability that the unseen class is present in the image based on the accompanying text, the semi-global branch is configured to generate the regional probability after the image is subdivided into the plurality of regions based on the annotation information and the accompanying text.

14. The image processing apparatus of claim 13, wherein, the global branch uses a text semantic extraction model to generate the probability that the unseen class is present in the image based on the accompanying text.

15. The image processing apparatus of claim 13, wherein, the local branch uses a first model to generate the probability that each pixel in the image is from the unseen class, and wherein the first model is obtained through training with the annotation information.

16. The image processing apparatus of claim 15, wherein the annotation information comprises coordinates of a pixel of a seen class, and the first model is trained by:
selecting a pixel of one seen class of a plurality of seen classes in one image in the image dataset as one verification data in a verification set;
selecting a pixel of another class of the plurality of seen classes as one training data in a training set; and
training the first model based on coordinates of pixels of seen classes in the verification set and the training set.

17. The image processing apparatus of claim 13, wherein, the semi-global branch generates the regional probability using a second model, which is obtained through training with the accompanying text and the annotation information.

18. The image processing apparatus of claim 17, wherein the regional probability comprises a first probability distribution that each pixel in each image subdivision region of a plurality of image subdivision regions generated after the image is subdivided into the plurality of regions is from the unseen class and a second probability distribution that the unseen class is present in each image subdivision region.

19. The image processing apparatus of claim 18, wherein the second model is trained by:
subdividing the image into the plurality of regions in a vertical direction or a horizontal direction;
generating a first training probability distribution that the unseen class is present in each image subdivision region based on the accompanying text;
generating a second training probability distribution that each pixel in each image subdivision region of the plurality of image subdivision regions is from the unseen class based on the annotation information;
constructing a loss function according to the first training probability distribution and the second training probability distribution; and
training the second model with the loss function.

20. A computer-readable storage medium for storing a computer-readable program that causes a computer to execute the image processing method of claim 1.

* * * * *